(12) United States Patent
Nemoto et al.

(10) Patent No.: US 10,283,738 B2
(45) Date of Patent: May 7, 2019

(54) SECONDARY BATTERY (71) Applicant: TOYOTA JIDOSHA KABUSHIKI KAISHA, Toyota-shi, Aichi-ken (JP)

(72) Inventors: Yuta Nemoto, Toyota (JP); Tomohiro Ono, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 71 days.

(21) Appl. No.: 15/681,515

(22) Filed: Aug. 21, 2017

(65) Prior Publication Data

US 2018/0102510 A1    Apr. 12, 2018

(30) Foreign Application Priority Data

Oct. 11, 2016   (JP) .................................. 2016-200294

(51) Int. Cl.
*H01M 2/02* (2006.01)
*H01M 2/04* (2006.01)
*H01M 2/30* (2006.01)
*H01M 2/34* (2006.01)

(52) U.S. Cl.
CPC ......... *H01M 2/0217* (2013.01); *H01M 2/021* (2013.01); *H01M 2/0404* (2013.01); *H01M 2/0473* (2013.01); *H01M 2/30* (2013.01); *H01M 2/345* (2013.01); *H01M 2/348* (2013.01); *H01M 2200/106* (2013.01); *H01M 2200/20* (2013.01)

(58) Field of Classification Search
CPC .. H01M 2/0217; H01M 2/021; H01M 2/0404; H01M 2/0473; H01M 2/30; H01M 2/345; H01M 2/348
See application file for complete search history.

(56) References Cited

U.S. PATENT DOCUMENTS

| | | | |
|---|---|---|---|
| 2004/0092167 A1* | 5/2004 | Barrault | H01M 2/26 429/211 |
| 2013/0196191 A1* | 8/2013 | Arai | H01M 2/06 429/61 |
| 2016/0336579 A1 | 11/2016 | Nemoto et al. | |

FOREIGN PATENT DOCUMENTS

| | | |
|---|---|---|
| JP | 2014-137891 A | 7/2014 |
| JP | 2016-219394 A | 12/2016 |

* cited by examiner

*Primary Examiner* — Jimmy Vo
(74) *Attorney, Agent, or Firm* — Sughrue Mion, PLLC (57) ABSTRACT

A secondary battery according to an embodiment of the present disclosure includes an external terminal electrically connecting a charge collector disposed inside a battery case with a terminal, a first part electrically connected to the charge collector, a second part electrically connected to the terminal, a first connection part electrically connecting the first part with the second part, and a second connection part electrically connecting the first part with the second part, the second connection part being different from the first connection part. The first connection part is ruptured when a displacement of the displacement part toward the outside of the battery case is transferred to the first connection part, and the second connection part becomes nonconductive when a temperature of the second connection part reaches a predefined temperature.

7 Claims, 10 Drawing Sheets

SECONDARY BATTERY

CROSS REFERENCE TO RELATED APPLICATIONS

This application is based upon and claims the benefit of priority from Japanese patent application No. 2016-200294, filed on Oct. 11, 2016, the disclosure of which is incorporated herein in its entirety by reference.

BACKGROUND

The present disclosure relates to a secondary battery.

An ordinary secondary battery includes, for example, a current cut-off mechanism to prevent the secondary battery from being overcharged when it is charged. In a secondary battery disclosed in Japanese Unexamined Patent Application Publication No. 2014-137891, a current cut-off mechanism is formed by joining a cylindrically-shaped charge-collecting protrusion disposed in the upper end of a positive-electrode-side charge collector inside the battery to the top of a bowl-shaped reverse plate connected to a fastening member for enabling an external connection (i.e., a terminal). Further, a top plate part is disposed in the top of this charge-collecting protrusion with a fragile part interposed therebetween, and a through-hole for preventing a difference between a pressure in a gap formed between the reverse plate and the top plate part and a pressure inside the battery is formed in the top plate part.

In the above-described current cut-off mechanism, when the temperature of the battery rises during a charging process, a gas pressure inside the battery increases. As a result, the gas present inside the battery passes through the through-hole and pushes up the reverse plate, so that the reverse plate is bent backward, i.e., is bent upward. Consequently, the fragile part is ruptured and the top plate part, which is joined to the reverse plate, is detached from the charge-collecting protrusion. As a result, the positive-electrode-side charge collector disposed inside the battery is electrically cut off from the fastening member for the external connection.

SUMMARY

The present inventors have found the following problem. In the secondary battery disclosed in Japanese Unexamined Patent Application Publication No. 2014-137891, the fragile part is ruptured and the top plate part, which is joined to the reverse plate, is detached from the charge-collecting protrusion, so that the positive-electrode-side charge collector is electrically cut off from the fastening member. Therefore, it is necessary to form the fragile part with such a small thickness that it ruptures when the reverse plate is bent backward, and hence the fragile part has a large electric resistance. As a result, there is a problem that the resistance of a conduction path between the positive-electrode-side charge collector and the fastening member is large.

The present disclosure provides a secondary battery capable of lowering a resistance of a conduction path between a charger collector and a fastening member.

A first exemplary aspect is a secondary battery including an external terminal electrically connecting a charge collector disposed inside a battery case with a terminal, and a displacement member configured to be displaced toward the outside of the battery case according to a rise in a pressure inside the battery case, in which the external terminal includes: a first part electrically connected to the charge collector; a second part electrically connected to the terminal; a first connection part electrically connecting the first part with the second part; and a second connection part electrically connecting the first part with the second part, the second connection part being different from the first connection part, the first connection part is ruptured when a displacement of the displacement part toward the outside of the battery case is transferred to the first connection part, and the second connection part becomes nonconductive when a temperature of the second connection part reaches a predefined temperature.

In the above-described configuration, since the secondary battery includes the second connection part in addition to the first connection part, the resistance of the conduction path between the charger collector and the terminal can be lowered.

In the above-described secondary battery, the second part preferably includes a cut-out part and at least a part of the first connection part is preferably disposed inside the cut-out part of the second part.

In the above-described secondary battery, the first part preferably includes a cut-out part and at least a part of the first connection part is preferably disposed inside the cut-out part of the first part.

According to the present disclosure, it is possible to lower a resistance of a conduction path between a charger collector and a fastening member.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

Preferred embodiments of a secondary battery according to the present disclosure are explained hereinafter in detail with reference to the drawings.

First Embodiment

Firstly, a configuration of a secondary battery according to this embodiment is explained. Note that the configuration of the secondary battery is explained below on the assumption that it is used in a normal use state. Further, for clarifying the explanation, the configuration of the secondary battery is explained by using an orthogonal coordinate system (i.e., an xyz-coordinate system).

Figure 1:
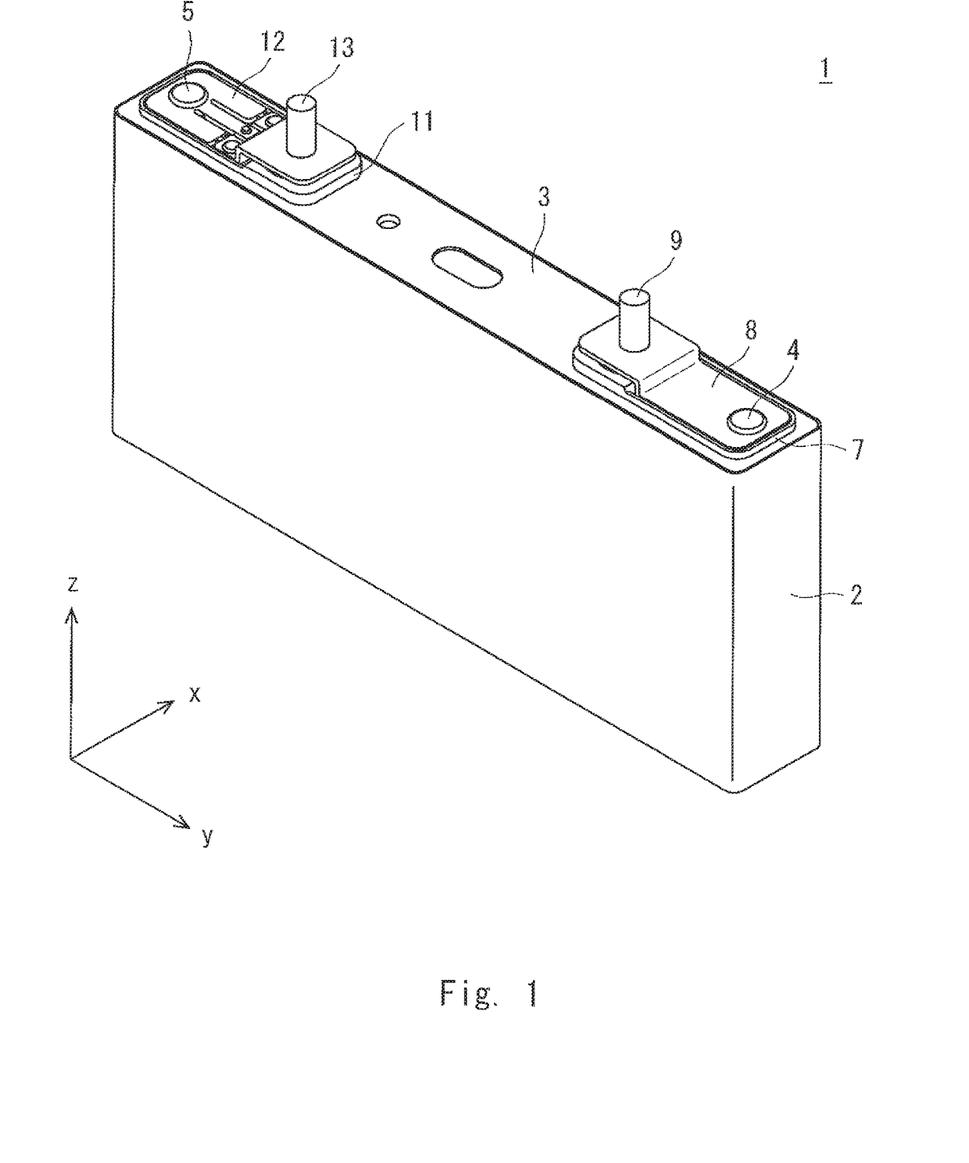
FIG. 1 is a perspective view of a secondary battery according to a first embodiment.
Figure 2:
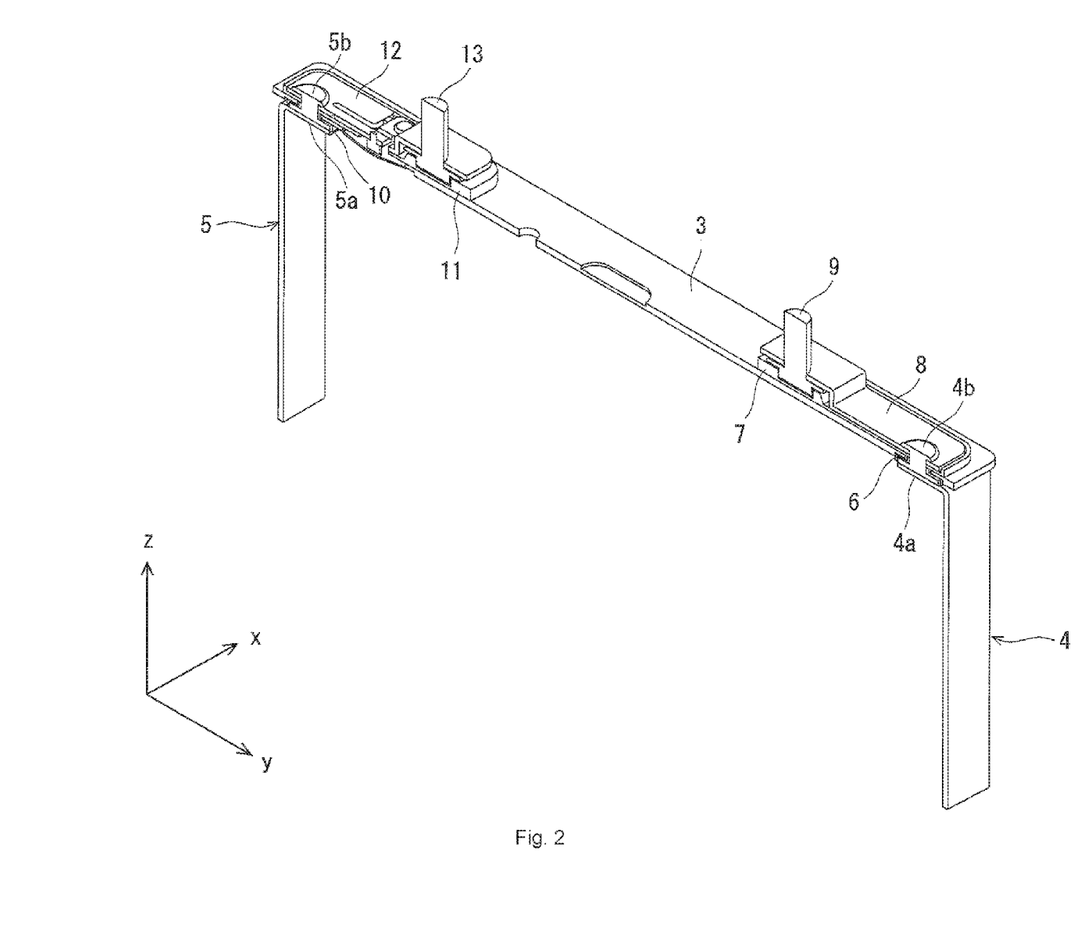
FIG. 2 is a cross section showing a structure on a conduction path in the secondary battery according to the first embodiment.

As shown in FIGS. 1 and 2, a secondary battery 1 according to this embodiment includes a battery case 2 with an opening formed therein on the positive side in the z-axis direction (hereinafter referred to as "the z-axis positive side") and a plate-like cover part 3 for closing the opening of the battery case 2. A negative-electrode-side charge collector (hereinafter referred to as a "negative-side charge collector") 4 and a positive-electrode side charge collector (hereinafter referred to as a "positive-side charge collector") 5 are disposed inside the battery case 2. Note that similar to an ordinary secondary battery, the secondary battery 1 according to this embodiment also includes an electrode wound body and an electrolyte (omitted in the figures). However, since they are not essential to the present disclosure, their explanations are omitted.

The negative-side charge collector 4 is electrically connected to a negative-electrode part of the electrode wound body. As shown in FIG. 2, a part of the negative-side charge collector 4 on the z-axis positive side is bent into an L-shape and a cylindrical fastening part 4$b$ is provided in an extending part 4$a$ extending in the y-axis negative direction.

The extending part 4$a$ of the negative-side charge collector 4 is disposed on the z-axis negative side of the cover part 3 and an insulating member 6 is disposed between the extending part 4$a$ of the negative-side charge collector 4 and the cover part 3. A plate-like insulator 7 made of resin is disposed on the z-axis positive side of the cover part 3. An external terminal plate 8 made of aluminum is disposed on the surface of the insulator 7 on the z-axis positive side. Further, a terminal 9 is also disposed on the surface of the insulator 7 on the z-axis positive side. This terminal 9 penetrates the external terminal plate 8 and protrudes in the z-axis positive direction.

The fastening part 4$b$ of the negative-side charge collector 4 penetrates the insulating member 6, the cover part 3, the insulator 7, and the external terminal plate 8. Further, the negative-side charge collector 4 is fixed to the external terminal plate 8 by riveting the top of the fastening part 4$b$. In this way, a conduction path is secured (i.e., formed) by the negative-side charge collector 4, the external terminal plate 8, and the terminal 9.

Figure 4:
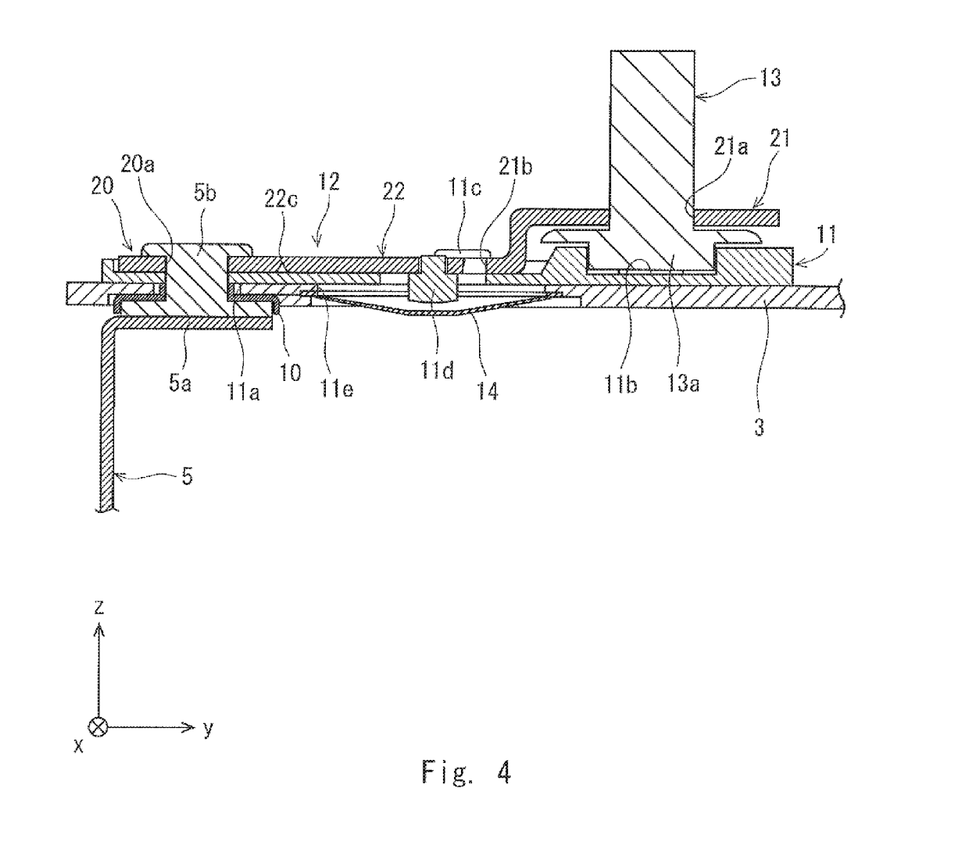
FIG. 4 is a cross section taken along a line IV-IV in FIG. 3.

The positive-side charge collector 5 is electrically connected to a positive-electrode part of the electrode wound body. As shown in FIGS. 2 and 4, a part of the positive-side charge collector 5 on the z-axis positive side is bent into an L-shape and a cylindrical fastening part 5$b$ is provided in an extending part 5$a$ extending in the y-axis positive direction.

As shown in FIG. 4, the extending part 5$a$ of the positive-side charge collector 5 is disposed on the z-axis negative side of the cover part 3 and an insulating member 10 is disposed between the extending part 5$a$ of the positive-side charge collector 5 and the cover part 3. A plate-like insulator 11 made of resin is disposed on the z-axis positive side of the cover part 3. An external terminal plate 12 made of aluminum is disposed on the surface of the insulator 11 on the z-axis positive side. Further, a terminal 13 is also disposed on the surface of the insulator 11 on the z-axis positive side. This terminal 13 penetrates the external terminal plate 12 and protrudes in the z-axis positive direction.

As shown in FIG. 4, the fastening part 5$b$ of the positive-side charge collector 5 penetrates the insulating member 10, the cover part 3, the insulator 11, and the external terminal plate 12. Further, the positive-side charge collector 5 is fixed to the external terminal plate 12 by riveting the top of the fastening part 5$b$.

Figure 5:
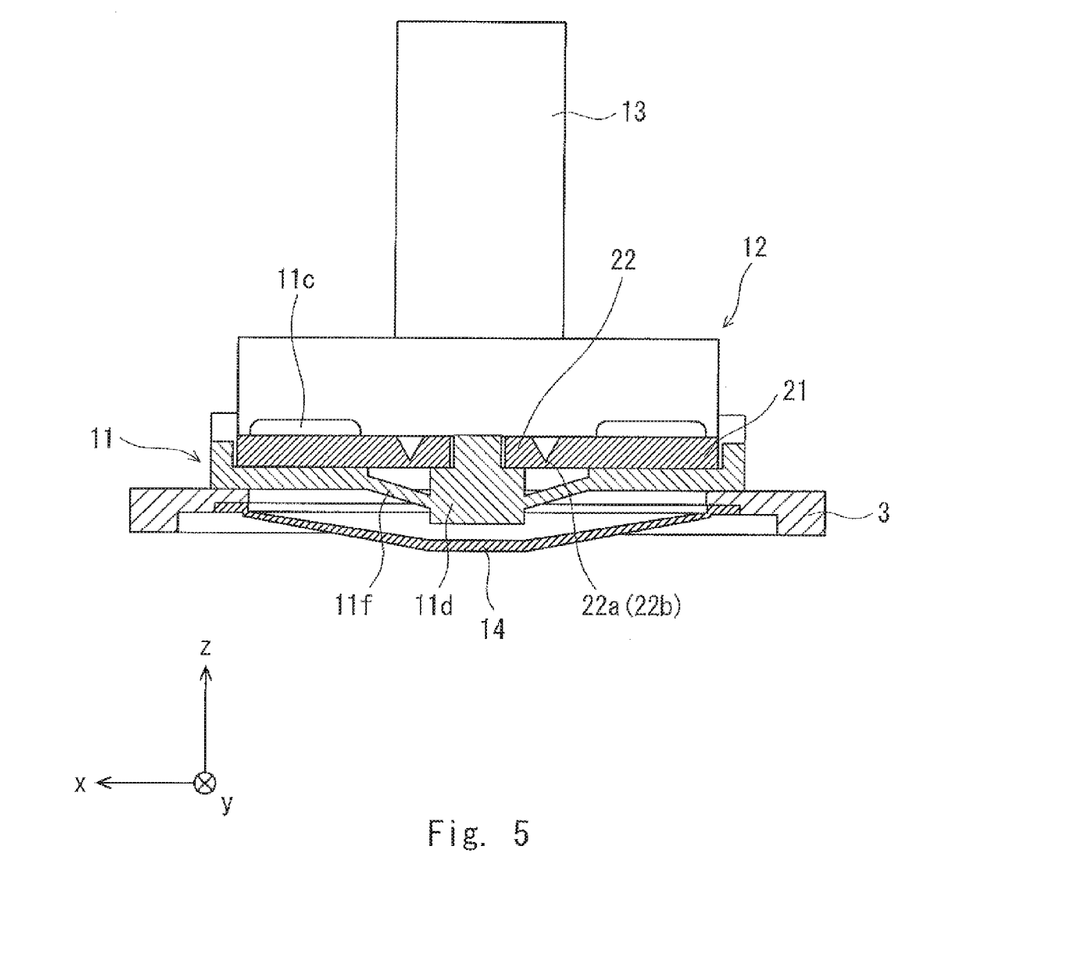
FIG. 5 is a cross section taken along a line V-V in FIG. 3.

As shown in FIGS. 4 and 5, a circular reverse plate (a displacement part) 14 is integrally provided on the positive-electrode side of the cover part 3 made of aluminum. The reverse plate 14 is formed with a small thickness so that it can be easily deformed and has roughly a bowl shape protruding in the z-axis negative direction. The above-described reverse plate 14 is disposed between the terminal 13 and the fastening part 5$b$ of the positive-side charge collector 5 in the y-axis direction and the surface of the reverse plate 14 on the z-axis negative side is exposed inside the secondary battery 1. As a result, the reverse plate 14 is displaced (or deformed) by a change in the pressure in the battery case 2.

Figure 6:
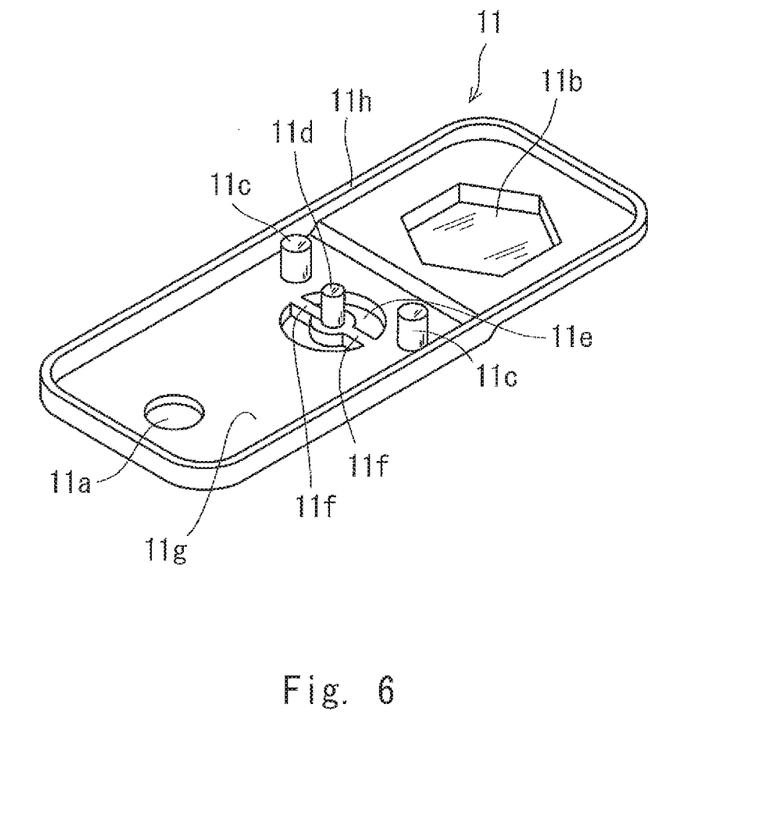
FIG. 6 is a perspective view of an insulator.

As shown in FIG. 6, the insulator 11 made of insulating resin includes a through-hole 11$a$ into which the fastening part 5$b$ of the positive-side charge collector 5 is inserted, a seating part 11$b$ in which a base end part 13$a$ of the terminal 13 is disposed (FIG. 4), cylindrical riveting parts 11$c$ that penetrate the external terminal plate 12 and are fixed to the external terminal plate 12, and a cylindrical load transfer part 11$d$ that is roughly in contact with the surface of the reverse plate 14 on the z-axis positive side. Further, an edge part 11$h$ is provided so as to surround a bottom plate part 11$g$ of the insulator 11. By this edge part 11$h$, the external terminal plate 12 can be reliably fit (or engaged) into the insulator 11.

As shown in FIG. 6, the cylindrical load transfer part 11$d$ is disposed at the center of a circular opening part (or a polygonal opening part) 11$e$ formed between the through-hole 11$a$ and the seating part 11$b$ in the y-axis direction and connected to the bottom plate part 11$g$ of the insulator 11 by connection pieces 11$f$ disposed inside the opening part 11$e$. By adopting the connection pieces 11$f$, the load transfer part 11$d$ can be integrally formed with the insulator 11 and the load transfer part 11$d$ can be reliably displaced in the z-axis direction inside the opening part 11$e$. Note that in this embodiment, the riveting parts 11$c$ are arranged in the x-axis direction with s space therebetween. The load transfer part 11$d$ is disposed roughly between the neighboring riveting parts 11$c$. That is, the load transfer part 11$d$ is disposed near the riveting parts 11$c$.

As an example in which the load transfer part 11$d$ can be integrally formed with the insulator 11, the load transfer part 11$d$ may be fixed to the insulator 11 by using an adhesive or by using injection molding. Further, the load transfer part 11$d$ may be fixed to the surface of the reverse plate 14 on the z-axis positive side by using an adhesive. The two connection pieces 11$f$ are arranged on a straight line so as to sandwich the load transfer part 11$d$ therebetween in the x-axis direction. By integrally forming the load transfer part 11$d$ with the insulator 11, the number of components can be reduced and hence the secondary battery 1 can be easily assembled. However, the arrangement and the number of the connection pieces 11$f$ are not limited to any particular arrangement and any particular number.

Figure 3:
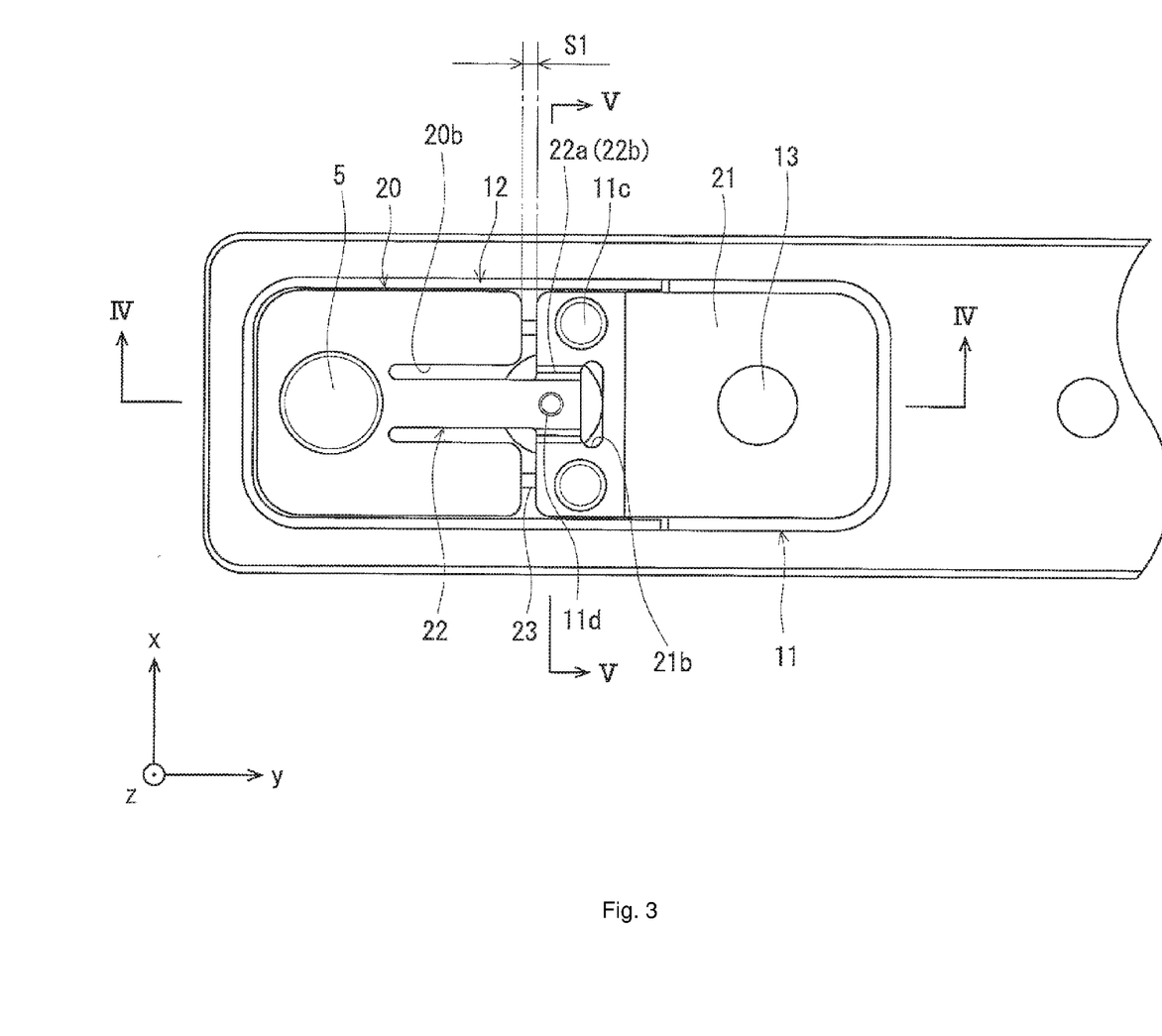
FIG. 3 is a plan view showing a state in which an insulator is mounted to an external terminal strip.

As shown in FIG. 3, the external terminal plate 12 has a roughly rectangular shape as its fundamental shape. Further, the external terminal plate 12 includes a first part 20 electrically connected to the positive-side charge collector 5, a second part 21 electrically connected to the terminal 13, a first connection part 22 electrically connecting the first part 20 with the second part 21, and a second connection part 23 electrically connecting the first part 20 with the second part 21. The second connection part 23 is provided separately from the first connection part 22.

As shown in FIG. 3, the first part 20 has a roughly rectangular shape as its fundamental shape as viewed in the z-axis direction. As shown in FIG. 4, a through-hole 20a is formed in the first part 20. The first part 20 is electrically connected to the positive-side charge collector 5 by inserting the fastening part 5b of the positive-side charge collector 5 into the through-hole 20a and riveting the top of the fastening part 5b. Further, as shown in FIG. 3, a cut-out part 20b that extends from the end face of the first part 20 on the y-axis positive side in the y-axis negative direction is formed in roughly the center of the first part 20 in the x-axis direction.

As shown in FIG. 3, the second part 21 has a roughly rectangular shape as its fundamental shape as viewed in the z-axis direction and is disposed so as to be spaced from the first part 20 by a gap Si in the y-axis direction. As shown in FIG. 4, a first through-hole 21a is formed in the second part 21 and the terminal 13 is inserted into this first through-hole 21a. Further, a second through-hole (not shown) is formed in the second part 21. The external terminal plate 12 is fixed to the insulator 11 by inserting the riveting part 11c of the insulator 11 into the second through-hole and riveting the top of the riveting part 11c. Further, as shown in FIG. 3, a cut-out part 21b that extends from the end face of the second part 21 on the y-axis negative side in the y-axis positive direction is formed in roughly the center of the second part 21 in the x-axis direction. The cut-out part 21b is disposed, for example, between the neighboring riveting parts 11c in the x-axis direction. The cut-out part 20b of the first part 20 and the cut-out part 21b of the second part 21 are opposed to each other in the y-axis direction and extend in the mutually-receding direction.

As shown in FIG. 3, the first connection part 22 has a roughly rectangular shape. Further, the first connection part 22 is disposed inside the cut-out part 20b of the first part 20 and the cut-out part 21b of the second part 21 and disposed across the gap S1 as viewed in the z-axis direction. Further, the end of the first connection part 22 on the y-axis negative side is connected to the bottom of the cut-out part 20b of the first part 20. Meanwhile, the end of the first connection part 22 on the y-axis positive side is connected to the second part 21 inside the cut-out part 21b of the second part 21. Note that in this embodiment, the ends of the first connection part 22 on the positive and negative sides in the x-axis direction are both connected to the second part 21.

As shown in FIGS. 3 and 5, a fragile part 22b is formed in a connection part 22a of the first connection part 22 at which the first connection part 22 is connected with the second part 21. The fragile part 22b is a part that is formed by forming a straight-line groove having a V-shape in cross section along the connection part 22a, at which the first connection part 22 is connected with the second part 21, and thereby reducing the thickness of that part. Therefore, the fragile part 22b in this embodiment extends in the y-axis direction (i.e., in the direction in which an axis that passes through the fastening part 5b of the positive-side charge collector 5 and the terminal 13 extends). However, the fragile part 22b is not limited to the part that is formed by forming a straight-line groove having a V-shape in cross section and thereby reducing the thickness of that part. That is, the fragile part 22b may be a part in the connection part 22a in which the thickness is locally reduced.

As shown in FIG. 3, the second connection part 23 is disposed across the gap Si. For example, second connection parts 23 are formed on both sides of the first connection part 22 in the x-axis direction. When the temperature of the second connection part 23 reaches a predetermined temperature, the second connection part 23 becomes nonconductive. For example, a PTC (Positive Temperature Coefficient) thermistor can be used as the second connection part 23. In this case, when the temperature of the second connection part 23 reaches the predetermined temperature, it has an insulating property (i.e., becomes nonconductive). However, the second connection part 23 may be any component that becomes nonconductive when its temperature reaches the predetermined temperature. Note the predetermined temperature is described later.

The cylindrical load transfer part 11d is disposed so as to be sandwiched between the above-described first connection part 22 of the external terminal plate 12 and the reverse plate 14. The end of the load transfer part 11d on the z-axis positive side is connected to the first connection part 22 near the fragile part 22b of the first connection part 22 and the riveting parts 11c are disposed near the fragile part 22b of the first connection part 22. By adopting the above-described structure, it is possible to reliably transfer a pushing-up force of the load transfer part 11d to the fragile part 22b of the first connection part 22 by using the riveting parts 11c as fixed points and thereby to reliably rupture (or break) the fragile part 22b of the first connection part 22. Note that the end of the load transfer part 11d on the z-axis positive side in this embodiment is fitted (or engaged) with the first connection part 22. It should be noted that although the end of the load transfer part 11d on the z-axis positive side in this embodiment is connected to the first connection part 22, the only requirement is that the end of the load transfer part 11d on the z-axis positive side should be roughly in contact with the surface of the first connection part 22 on the z-axis negative side in a normal use state.

Next, an action that is performed when a pressure inside the secondary battery 1 rises and the electrical connection between the first and second parts 20 and 21 is cut off is explained.

Figure 7:
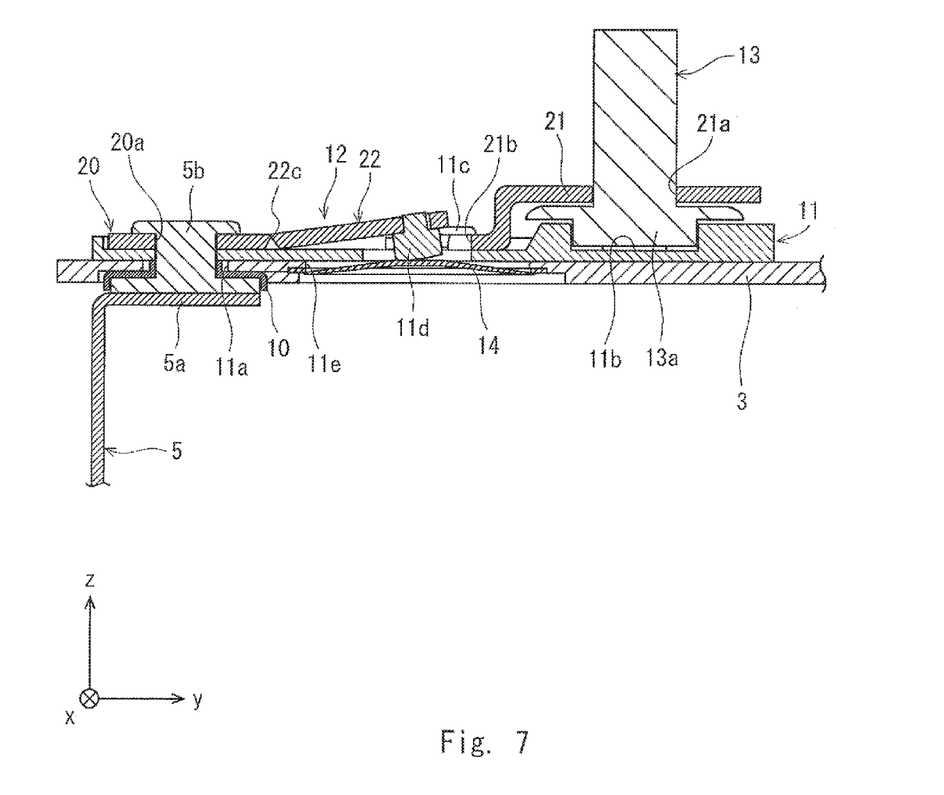
FIG. 7 is a cross section corresponding to FIG. 4, showing a state in which a first connection part has ruptured.
Figure 8:
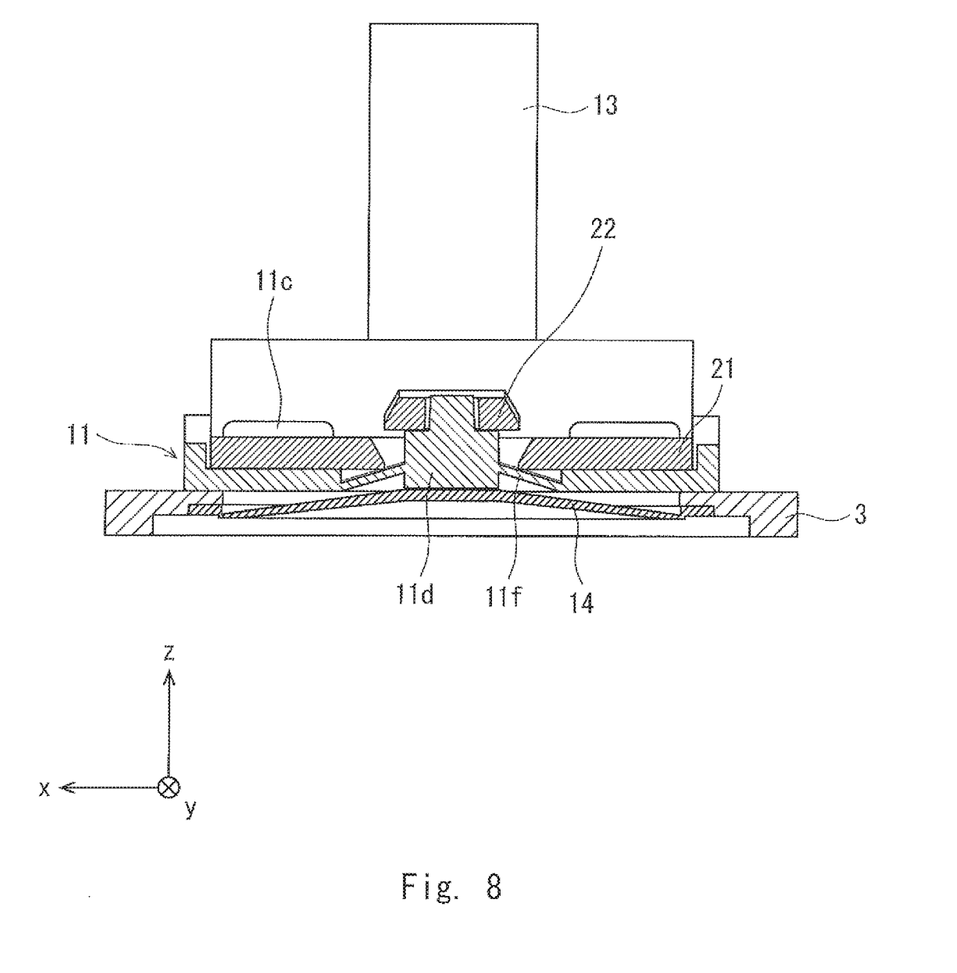
FIG. 8 is a cross section corresponding to FIG. 5, showing a state in which the first connection part has ruptured.

As shown in FIGS. 7 and 8, in the secondary battery 1, when its internal temperature becomes high and hence the pressure inside the battery case 2 rises, the reverse plate 14 is pressed by the pressure and deformed into a convex shape in the z-axis positive direction. That is, the reverse plate 14 is deformed so as to be bent backward (i.e., bent upward in the figure). As a result of this deformation, a load is transferred to the first connection part 22 through the load transfer part 11d. In this state, by the pushing-up force of the load transfer part 11d, the fragile part 22b of the first connection part 22 is ruptured and hence the first connection part 22 is displaced in such a manner that the first connection part 22 is bent (or folded) roughly around an axis parallel to the x-axis at the end of the first connection part 22 on the y-axis negative side (i.e., an axis perpendicular to an axis that passes through the fastening part 5b of the positive-side charge collector 5 and the terminal 13). As a result, the electrical connection between the first and second parts 20 and 21 formed by the first connection part 22 is cut off.

Meanwhile, when the heat inside the battery case 2, which has had a high temperature, is transferred to the second connection part 23 through the positive-side charge collector 5 and the first part 20, or an electrical current is concentrated on the second connection part 23 due to the cut-off of the electrical connection between the first and second parts 20 and 21 formed by the first connection part 22 and hence the temperature of the second connection part 23 reaches the predetermined temperature, the second connection part 23 becomes nonconductive. As a result, the electrical connection between the first and second parts 20 and 21 formed by the second connection part 23 is cut off. Note that the electrical connection between the first and second parts 20 and 21 formed by the first connection part 22 may be cut off before or after the cut-off of the electrical connection between the first and second parts 20 and 21 formed by the second connection part 23. Alternatively, they may be cut off at the same time.

Note that the predetermined temperature is preferably set to a temperature inside the battery case 2 at which the pressure inside the battery case 2 reaches a predetermined pressure and hence the electrical connection between the first and second parts 20 and 21 is cut off. For example, the predetermined temperature may be set to about 100° C. However, the predetermined temperature may be set to any temperature at which, when the secondary battery 1 is overcharged, the electrical connection between the first and second parts 20 and 21 can be cut off.

As described above, as the fragile part 22b of the first connection part 22 is ruptured (or broken) and the second connection part 23 becomes nonconductive, the electrical connection between the first and second parts 20 and 21 is cut off. Note that when the fragile part 22b of the first connection part 22 is ruptured by using the backward bending (i.e., upward bending in the figure) of the reverse plate 14 as described above, the thickness of the fragile part 22b of the first connection part 22 in the z-axis direction and the length thereof in the y-axis direction need to be set (or adjusted) so that the fragile part 22b of the first connection part 22 is ruptured by the backward bending of the reverse plate 14. Therefore, the area of the fragile part 22b of the first connection part 22 through which an electrical current flows (hereinafter referred to as a "conductive area") becomes narrow and hence the electrical resistance of the fragile part 22b of the first connection part 22 increases.

On the other hand, if the thickness of the fragile part 22b of the first connection part 22 in the z-axis direction and the length thereof in the y-axis direction are set so that a conductive area capable of reducing the electrical resistance of the fragile part 22b is secured, the amount of displacement of the reverse plate 14 required to rupture the fragile part 22b increases. Therefore, it is necessary to secure a space in which the reverse plate 14 can be displaced inside the battery case 2. As a result, the dead space inside the battery case 2 increases and hence the capacitive density decreases.

In contrast to this, in the secondary battery 1 according to this embodiment, since the first part 20 is electrically connected with the second part 21 by using the second connection part 23 in addition to the first connection part 22, the resistance in the conduction path between the positive-side charge collector 5 and the terminal 13 can be reduced. In this way, the secondary battery 1 according to this embodiment can narrow (i.e., reduce) the conductive area of the fragile part 22b of the first connection part 22 compared to the conductive area in the case in which the first part 20 is electrically connected with the second part 21 by using the first connection part 22 alone. Therefore, it is possible to prevent or reduce an increase in the amount of displacement of the reverse plate 14 required to rupture the fragile part 22b of the first connection part 22. Consequently, it is possible to prevent or reduce a decrease in the battery density.

As described above, the secondary battery 1 according to this embodiment can reduce the resistance of the conduction path between the positive-side charge collector 5 and the terminal 13 in a normal use state while preventing the decrease in the battery density.

Further, in this embodiment, the direction in which the first connection part 22 is bent and the fragile part 22b of the first connection part 22 is gradually ruptured is roughly parallel to the direction in which the fragile part 22b extends. Therefore, since a stress is concentrated on the fragile part 22b when the first connection part 22 is bent, the fragile part 22b of the first connection part 22 can be ruptured by a small load (i.e., a small force) compared to the case in which the direction in which the first connection part 22 is bent and the fragile part 22b is gradually ruptured is roughly perpendicular to the direction in which the fragile part 22b extends. Consequently, the amount of displacement of the reverse plate 14 can be reduced compared to the case in which the direction in which the first connection part 22 is bent and the fragile part 22b is gradually ruptured is roughly perpendicular to the direction in which the fragile part 22b extends.

Note that as shown in FIGS. 4 and 7, a thin part 22c for inducing the first connection part 22 to bend is preferably formed in the end of the first connection part 22 on the y-axis negative side. In this way, it is possible to bend the first connection part 22 by a small force and thereby to reduce the amount of displacement of the reverse plate 14.

Further, it is preferable to adopt a configuration in which the heat generated in the second connection part 23 can be reduced and a malfunction of the second connection part 23 is thereby prevented in a normal use state of the secondary battery 1. For example, it is preferable that the electrical resistance value of the second connection part 23 is made higher than that of the fragile part 22b of the first connection part 22, so that an electrical current is prevented from being concentrated on the second connection part 23 and the heat generated in the second connection part 23 is thereby reduced in a normal use state of the secondary battery 1.

Second Embodiment

Figure 9:
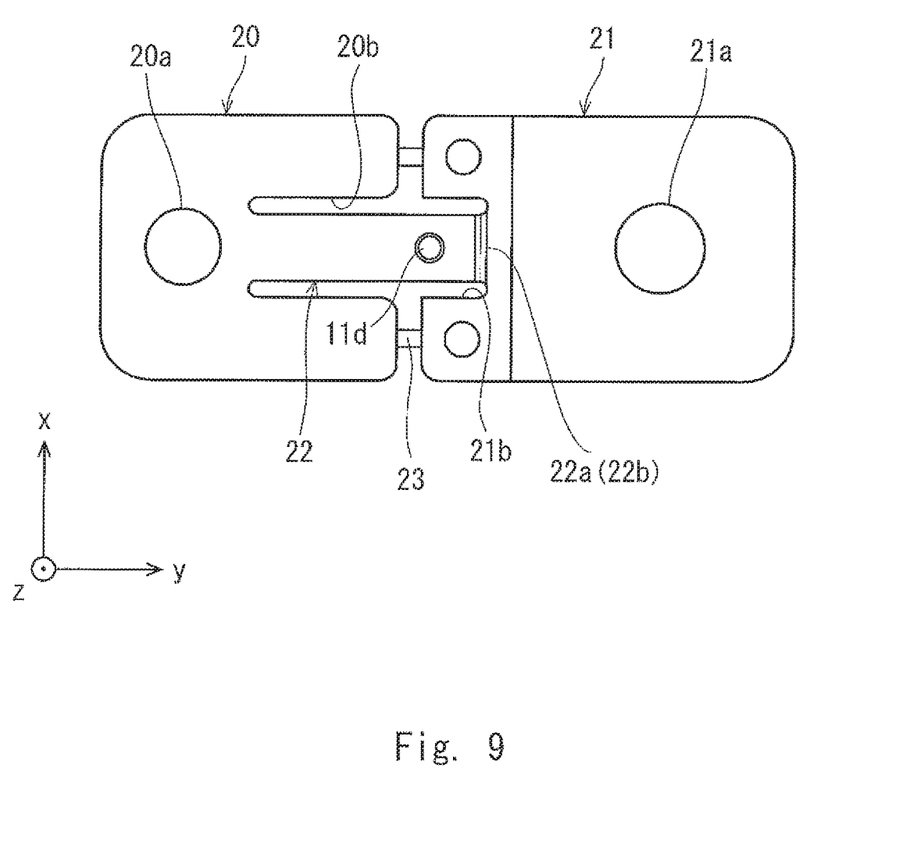
FIG. 9 is a plan view showing an external terminal strip according to a second embodiment.

In the first embodiment, the ends of the first connection part 22 on the positive and negative sides in the x-axis direction are both connected to the second part 21. However, as shown in FIG. 9, the end of the first connection part 22 on the y-axis positive side may be connected to the bottom of the cut-out part 21b of the second part 21. Even in this case, the fragile part 22b is formed along the connection part between the first connection part 22 and the second part 21.

Figure 10:
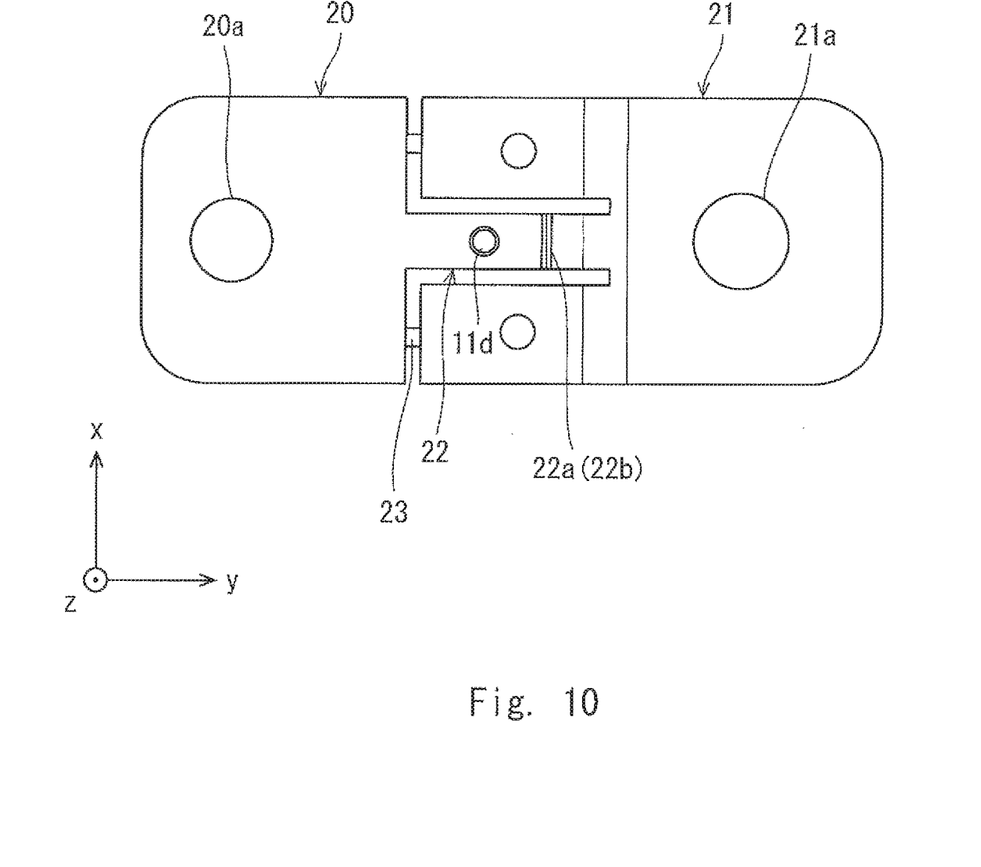
FIG. 10 is a plan view showing another external terminal strip according to the second embodiment.

Further, either the cut-out part 20b of the first part 20 or the cut-out part 21b of the second part 21 may be omitted. For example, when the cut-out part 20b of the first part 20 is omitted as shown in FIG. 10, the end of the first connection part 22 on the y-axis negative side may be connected to the end face of the first part 20 on the y-axis positive side. Further, the end of the first connection part 22 on the y-axis positive side may be connected to the second part 21 while being disposed inside the cut-out part 21b of the second part 21.

In short, the only requirement is that the first connection part 22 should be connected to the first and second parts 20 and 21 so that the electrical connection between the first and second parts 20 and 21 is cut off by the displacement of the reverse plate 14.

The present disclosure is not limited to the above-described embodiments and the following various modifications can be made without departing from the scope of the present disclosure.

For example, although the second connection parts 23 are disposed on both sides of the first connection part 22 in the above-described embodiments, the arrangement and the number of the second connection parts 23 can be changed as desired.

For example, although the reverse plate 14 is used as the displacement part in the above-described embodiments, the displacement part may have any configuration in which the displacement part can be displaced in the z-axis direction based on a change in the pressure inside the battery case 2.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A secondary battery comprising an external terminal electrically connecting a charge collector disposed inside a battery case with a terminal, and a displacement member configured to be displaced toward the outside of the battery case according to a rise in a pressure inside the battery case, wherein the external terminal comprises:
a first part electrically connected to the charge collector;
a second part electrically connected to the terminal;
a first connection part electrically connecting the first part with the second part; and
a second connection part electrically connecting the first part with the second part, the second connection part being different from the first connection part, the first connection part is ruptured when a displacement of the displacement part toward the outside of the battery case is transferred to the first connection part, and the second connection part becomes nonconductive when a temperature of the second connection part reaches a predefined temperature.

2. The secondary battery according to claim 1, wherein the second part comprises a cut-out part and at least a part of the first connection part is disposed inside the cut-out part of the second part.

3. The secondary battery according to claim 1, wherein the first part comprises a cut-out part and at least a part of the first connection part is disposed inside the cut-out part of the first part.

4. The secondary battery according to claim 1, wherein a fragile part is formed in a connection part of the first connection part at which the first connection part is connected with the second part.

5. The secondary battery according to claim 4, further comprising a load transfer part configured to transfer a displacement of the displacement part toward the outside of the battery case to the first connection part, wherein the displacement part is disposed in a cover part of the battery case and is displaced according to a change in the pressure inside the battery case.

6. The secondary battery according to claim 5, wherein the load transfer part is disposed near the fragile part.

7. The secondary battery according to claim 4, wherein the charge collector comprises a fastening part electrically connected to the external terminal, the first connection part is able to bend around an axis perpendicular to an axis that passes through the fastening part and the terminal, and the fragile part extends parallel to the axis passing through the fastening part and the terminal.

* * * * *